United States Patent
Albrecht et al.

[15] 3,671,520
[45] June 20, 1972

[54] ANTIMICROBIAL INDANONES

[72] Inventors: Rudolf Albrecht; Hans-Joachim Kessler; Eberhard Schroder, all of Berlin, Germany

[73] Assignee: Schering AG, Berlin und Bergkamen, Berlin, Germany

[22] Filed: March 27, 1970

[21] Appl. No.: 23,487

[30] Foreign Application Priority Data

March 29, 1969 Germany .................... P 19 16 825.3
Oct. 29, 1969 Germany .................... P 19 55 386.7

[52] U.S. Cl. .................. 260/240 A, 260/240.1, 260/240.4, 260/346.2 R, 424/274, 424/285
[51] Int. Cl. ....................................................... C07d 99/04
[58] Field of Search ................... 260/240 A, 240.1, 240.4

[56] References Cited

UNITED STATES PATENTS

| | | | |
|---|---|---|---|
| 3,397,199 | 8/1968 | Dunn | 260/240 |
| 3,397,200 | 8/1968 | Dunn | 260/240 |
| 3,479,343 | 11/1969 | Johnston | 260/240 |
| 3,496,066 | 2/1970 | Berger et al. | 195/103.5 |
| 3,483,193 | 12/1969 | Gall et al. | 260/240 |
| 3,506,656 | 4/1970 | Berger et al. | 260/240 |

FOREIGN PATENTS OR APPLICATIONS

41/2552   2/1966   Japan ............................... 260/240 A

OTHER PUBLICATIONS

Toyoshima et al., Yakugaku Zasshi 88(5), 589–92 (1968).

*Primary Examiner*—Henry R. Jiles
*Assistant Examiner*—G. Thomas Todd
*Attorney*—Millen, Raptes & White

[57] ABSTRACT

Compounds of the formula

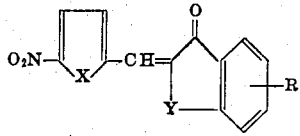

wherein X is O, S or NH, Y is —$CH_2$— and R is nitro, benzoyloxy, alkoxycarbonyloxy, N-mono-alkylaminocarbonyloxy, N,N-dialkylaminocarbonyloxy or an N-substituted-aminoalkoxy group, having antimicrobial activity, e.g., against *Trichomonas vaginalis*.

21 Claims, No Drawings

ANTIMICROBIAL INDANONES

BACKGROUND OF THE INVENTION

This invention relates to novel disubstituted indanones and to their use as antimicrobials.

SUMMARY OF THE INVENTION

The compounds of this invention have the formula

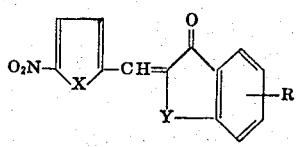

(I)

wherein X is an oxygen atom, a sulfur atom, or an NH-group; Y is a -CH$_2$-group; and R is a nitro group or a benzoyloxy, alkoxycarbonyloxy, N-monoalkylaminocarbonyloxy, N,N-dialkylamino-carbonyloxy group, or N-substituted- or N-unsubstituted aminoalkoxy-group, including the acid addition salts of those of the above compounds which contain a basic amino group. DETAILED DISCUSSION OF THE INVENTION Of the compounds of this invention, a preferred class are those wherein X is O OR -NH-. In these preferred classes, the preferred compounds are those wherein R is in the 4, 5 or 6 position.

With respect to the compounds of this invention wherein R is an N-substituted aminoalkoxy group, includes are those which are mono-substituted and those which are disubstituted.

Preferred N-substituted aminoalkoxy groups are those wherein the amino group is monoalkylamino, e.g., methylamino, ethylamino, dialkylamino, e.g., dimethylamino, diethylamino, pyrrolidino, piperidino, piperazino, N-alkylpiperazino, e.g., N-methylpiperazino, N-acylpiperazino, e.g., N-acetylpiperazino, or morpholino.

In the above-described compounds, alkyl, alkoxy and acyl each contain one to five carbon atoms. For example, alkyl can be methyl, ethyl, propyl, isopropyl, n-butyl, sec.-butyl, t-butyl, amyl, preferably methyl or ethyl; alkoxy can be methoxy, ethoxy, n-propoxy, isopropoxy, amyloxy, etc., preferably ethoxy; and acyl can be formyl, acetyl, propionyl, n-butyryl, etc., preferably acetyl.

The R substituent on the benzo ring of the indanone group can be at the 4, 5 or 6 position, preferably the 4 or 5 position.

As stated above, the aminoalkoxy and aminocarbonyloxy compounds of this invention can be present in free base form or in acid addition salt form. Preferred are the acid addition salts of the physiologically acceptable acids, such as, for example, hydrochloric acid, sulfuric acid, phosphoric acid, acetic acid, propionic acid, succinic acid, citric acid, benzoic acid, salicylic acid, etc. Acid addition salts of other acids can be used for isolation, purification and characterization purposes.

Although the preferred compounds of this invention are those of Formula I as defined hereinabove, in its broader aspect, this invention relates to indanones of a Formula in which R is an esterified or etherified hydroxy group at the 4, 5 or 6, preferably 4 or 5 position, e.g., containing 1 to 14, preferably 1 to 7 carbon atoms and 0 to 4, preferably 0 to 1, rings and 0 to 3, preferably 0 to 2, hetero atoms in addition to the ester or ether group. Examples of esterified hydroxy groups are acyloxy groups wherein the acyl group is the acyl radical of, for example, an aryl or alkaryl acid, e.g., benzoic, 2,3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aromatic hydroxyacid, e.g., salicylic acid, an aromatic aminoacid, e.g., para-aminosalicylic, para-aminobenzoic, other aromatic heterosubstituted acids, e.g., 2,3,4-trimethoxybenzoic, carbamic acids, e.g., carbamic acid, phenylcarbamic, n-butylcarbamic, dimethylcarbamic, diethylcarbamic, allophanic, or a heterocyclic acid, e.g., β-furyl-carboxylic, N-methylpyrrolidyl-2-carboxylic, α-picolinic, indole-2-carboxylic, 6-hydroxy-indolyl-3-acetic, N-methylmorpholyl-2-carboxylic, lysergic, pyrrolyl-2-carboxylic, or other acyl acid.

Examples of etherified hydroxy groups are aminoethoxy wherein the amino group is NH$_2$ or a secondary or tertiary acyclic amino, e.g., alkylamino, dialkylamino, hydroxyalkylamino, e.g., hydroxyethylamino, dihydroxyalkylamino, e.g., dihydroxyethylamino, arylamino, aralkylamino, alkarylamino group or alicylic amino, e.g., cyclohexylamino, methylcyclohexylamino or heterocyclicamino containing e.g., from one to 14, preferably one to six carbon atoms, and one to three, preferably one to two, heteroatoms including the amino nitrogen atom and one to three, preferably zero or one, rings, e.g., wherein the ring is a pyrrolidine, piperidine, imidazole, triazole, tetrazole, oxazole, dioxazole, isothiazole, pyridazine, pyrimidine, piperazine, isoxazine, morpholine, indole, benzoxazine, etc., ring.

Specific examples of compounds of this invention which can be produced by the process of this invention are 2-(5-nitro-2-thenylidene)-5-R-1-indanone wherein R is nitro, benzoyloxy, methoxycarbonyloxy, diethylaminoethoxy, dimethylaminoethoxy, pyrrolidinoethoxy and morpholinoethoxy, respectively by the condensation of 2-formyl-5-nitro-thiophene with the corresponding 5-R-1indanones wherein R is the same as the condensation products or with 2-formylthiophene followed by nitration at the 5-position of the thiophene ring.

Alternatively, the 5-hydroxy compounds corresponding to the above products can be produced in the above-described condensations and the 5-hydroxy group of the condensation product esterified, etherified or exchanged by a nitro group to produce the desired R group.

The process for preparing the novel compounds of this invention can be described generically as follows:

a. an aldehyde of the general formula

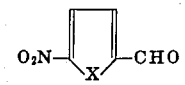

(IIa)

wherein X has the value given above or a functional derivative of the aldehyde group, is reacted with a compound of the formula

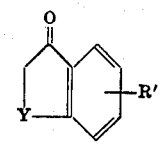

(IIb)

wherein R' is R as defined above or a hydroxy group, and Y has the value given above, or b. a compound of the formula

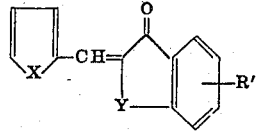

(III)

wherein X, Y and R' have the values given above, is nitrated and, when R' is a hydroxy group, thereafter esterified as described hereinafter; and c. a compound of the formula

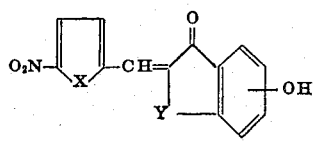

(IV)

wherein X and Y have the values given above and the -OH group is at the 4, 5 or 6 position of the indanone ring, obtained, for example, in accordance with (a) or (b), is converted by esterification, into the benzoyloxy, alkoxycarbonyloxy, N-monoalkylaminocarbonyloxy, or N,N-dialkylaminocarbonyloxy compounds; and d. a compound of Formula I wherein R' is an N-substituted aminoalkoxy or aminocarbonyloxy group is converted to the acid addition salt thereof with an organic or inorganic acid.

The esterification of the hydroxy group according to (c) can be conducted, e.g., with a benzoyl halide, an alkyl ester of chloroformic acid, an alkyl isocyanate, or an N,N-dialkylcarbamic acid halide, employing conventional procedures.

The process according to (a) can be conducted at room temperature or at an elevated temperature, e.g., 25° to 150° C, in an acidic reaction medium, preferably in glacial acetic acid in the presence of concentrated sulfuric acid, in orthophosphoric acid or in acetic anhydride. Examples of aldehydic functional derivatives are bisulfite addition products (-CHOH-SO$_3$M wherein M is an alkali or alkaline earth metal, e.g., Nat);hemi-acetals, (-CHOH-OAlk); acetals, (-CH(OAlk)$_2$ and

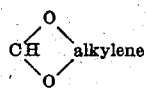

wherein "Alk" in each instance is lower-alkyl; preferably methyl or ethyl; oximes (-CH = NOH); Schiff base (-CH = N-Ar wherein Ar is an aryl group conventionally present in Schiffbases), a hydrazone (-CH = N-NHZ wherein Z is H, Ar, CONH$_2$, CONHAr, COOAlk, CSNH$_2$, etc.) or an azine (-CH = N-N = CH-CHAlk-). Preferred aldehydic functional derivatives are the diacetates.

The nitration according to (b) can be conducted in accordance with the conventional methods, for example with nitric acid in a mixture of acetic anhydride and acetic acid.

The compounds of Formula I generally are crystalline compounds exhibiting low solubility or insolubility in water. They can be isolated from the reaction mixtures obtained during the synthesis thereof by pouring into ice water. For purification purposes, the compounds can be recrystallized, for example, from ethanol, glacial acetic acid, ethyl acetate, dioxane, tetrahydrofuran, dimethylformamide, nitromethane. The acid addition salts can be isolated from the reaction mixtures by evaporation under reduced pressure and can be purified by recrystallization from alcohols or alcohol/water mixtures. Those compounds containing a basic amino group can be purified via or as their acid addition salts, e.g., hydrochloride, hydrobromide, hydriodide, sulfate, phosphate, nitrate, acetate, formate, citrate, tartrate and lactate.

The novel compounds of Formula I exhibit good antimicrobial activity especially protozoacidal activity and particularly against *Trichomonas vaginalis*. The table below demonstrates the greater inhibitory effect of the novel substances against *Trichomonas vaginalis* compared with metronidazole [1-β-hydroxyethyl)-2-methyl-5-nitroimidazole], a known, commercial preparation. The toxicity of the novel compounds is low.

TABLE I

| Compound | Minimum Inhibitory Concentration in Mg/ml. against Trichomonas vaginalis |
|---|---|
| Metronidazole | 1.56 |
| 2-(5-Nitro-2-pyrrolyl-methylene)-4-nitro-1-indanone | 0.05 |
| 2-(5-Nitro-2-furfurylidene)-5-benzoyloxy-1-indanone | 0.10 |
| 2-(5-Nitro-2-furfurylidene)-5-methoxycarbonyloxy-1-indanone | 0.05 |
| 2-(5-Nitro-2-furfurylidene)-5-(2-pyrrolidinoethoxy)-1-indanone sulfate | 0.05 |
| 2-(5-Nitro-2-furfurylidene)-5-(2-morpholinoethoxy)-1-indanone sulfate | 0.10 |

The compounds of Formula I are useful in the treatment of *Trichomonas vaginalis* infections. For such use, they can be formulated into conventional drug forms with the additives, carrier substances, and flavoring agents customary in pharmaceutical preparations which do not deleteriously react with the effective agents, employing conventional methods. For oral application, particularly suitable are tablets, dragees, capsules, pills, suspensions and solutions. Such compositions can employ, for example, water, alcohol, polyethylene glycols, gelatin, sucrose, lactose, amylose in solutions and suspensions and magnesium stearate, talc, starch, sugars, etc., in tablets. The concentration of the effective agent in the thus-formulated compositions is dependent on the activity of the specific compound employed, the responsiveness of the individual patient and the mode of administration. Generally, they contain about 0.05 to 2.0 g., preferably about 0.1 to 0.5 g, of a compound of this invention and 0.1 to 5 g of a pharmaceutical carrier per unit dose. Tablets usually contain about 0.1 to 0.5 g. of a compound of this invention. The daily dosage is usually about 0.1 to 2.0 g.

For topical application, the compounds of this invention can be applied as a powder, solution suspension, foam or aerosol or as vaginal tablets and suppositories. For parenteral application, aqueous or oily solution or suspensions can be used.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

2-(5-Nitro-2-furfurylidene)-4-nitro-1-indanone 888 mg. (5 millimols) of 4-nitro-1-indanone and 1.21 g. (5 millimols) of 5-nitrofurfural diacetate are stirred in 20 ml. of orthophosphoric acid (85 percent) for 5 hours at 80° C. Then, the reaction mixture is poured into ice water; the solid product is filtered off and recrystallized from dioxane. Yield: 470 mg. (31 percent of theory) of the title compound, m.p. 238° C. (decomposition).

| $C_{14}H_8N_2O_6$ | (300.2) |
|---|---|
| Calculated: | N 9.34 |
| Found: | N 9.19 |

EXAMPLE 2

2-(5-Nitro-2-pyrrolyl-methylene)-4-nitro-1-indanone

The title compound is produced analogously to Example 1 with 5 millimols of 4-nitro-1-indanone and 700 mg. (5 millimols) of 5-nitropyrrole-2-carboxaldehyde. The product is recrystallized from dimethylformamide; yield: 480 mg. (32 percent of theory) of the title compound, m.p. above 300° C.

| $C_{14}H_9N_3O_5$ | (299.3) |
|---|---|
| Calculated: | N 14.05 |
| Found: | N 14.15 |

EXAMPLE 3

2-(5-Nitro-2-furfurylidene)-5-benzoyloxy-1-indanone a. 2.96 g. of 5-hydroxyindanone is suspended in 20 ml. of orthophosphoric acid (85 percent), and mixed with 2.82 g. of nitrofurfural. The reaction mixture is stirred for 7 hours at 50° C. and then poured into ice water; the insoluble product is filtered off and recrystallized from ethanol. Yield: 0.95 g. of 2-(5-nitro-2-furfurylidene)-5-hydroxy-1-indanone, m.p. 230° C. (decomposition).

b. 2.7 g. (10millimols) of 2-(5-nitro-2-furfurylidene)-5-hydroxy-1-indanone and 2.4 g. (20 millimols) of benzoyl chloride are stirred in 420 ml. of pyridine for 2 hours at room temperature, then poured into water, acidified wit HCl, and shaken out with ethyl acetate. The ethyl acetate solution is washed with dilute hydrochloric acid and water, dried over Na$_2$SO$_4$, evaporated, and the residue is recrystallized from dimethylformamide. Yield: 1.3 g. (34 percent of theory) of the title compound, m.p. 197°–199° C. (decomposition).

| C$_{21}$H$_{13}$NO$_6$ | (375.3) |
| --- | --- |
| Calculated: | N 3.73 |
| Found: | N 3.80 |

EXAMPLE 4

2-(5-Nitro-2-furfurylidene)-5-methoxycarbonyloxy-1-indanone 2.7 g. (10 millimols) of 2-(5-nitro-2-furfurylidene)-5-hydroxy-1-indanone and 2.8 g. (30 millimols) of methyl chloroformate are stirred in 100 ml. of pyridine for 3½ hours at room temperature, then poured into ice water, and shaken out with ethyl acetate. The ethyl acetate solution is washed with 1M HCl and water, dried, evaporated, and the residue is recrystallized from dimethylformamide. Yield: 1.6 g. (48 percent of theory) of the title compound, m.p. 199°–202° C. (decomposition).

| C$_{16}$H$_{11}$NO$_7$ | (329.3) |
| --- | --- |
| Calculated: | N 4.25 |
| Found | N 4.31 |

EXAMPLE 5

2-(5-Nitro-2-furfurylidene)-5-ethoxycarbonyloxy-1-indanone

The title compound is produced analogously to Example 4 with ethyl chloroformate and recrystallized from dimethylformamide. Yield: 1.0 g. (58 percent of theory); m.p. 154°–158° C. (decomposition).

| C$_{17}$H$_{13}$NO$_7$ | (343.3) |
| --- | --- |
| Calculated: | N 4.08 |
| Found: | N 4.34 |

EXAMPLE 6

2-(5-Nitro-2-furfurylidene)-5-dimethylaminocarbonyloxy-1-indanone

The title compound is prepared analgously to Example 4 with dimethylcarbamoyl chloride and recrystallized from ethyl acetate. Yield: 35 percent of theory; m.p. 203°–205° C. (decomposition).

| C$_{17}$H$_{14}$N$_2$O$_6$ | (342.3) |
| --- | --- |
| Calculated: | N 8.18 |
| Found: | N 8.06 |

EXAMPLE 7

2-(5-Nitro-2-furfurylidene)-5-diethylaminocarbonyloxy-1-indanone

The title compound is obtained analgously to Example 4 with diethylcarbamoyl chloride and recrystallized from ethanol. Yield is 32 percent of theory; m.p. 161°–163° C. (decomposition).

| C$_{19}$H$_{18}$N$_2$O$_6$ | (370.3) | |
| --- | --- | --- |
| Calculated: | C 61.63 | H 4.90 |
| Found: | C 61.57 | H 4.98 |

EXAMPLE 8

2-(5-Nitro-2-furfurylidene)-5-methylaminocarbonyloxy-1-indanone 540 mg. (2 millimols) of 2-(5-nitro-2-furfurylidene)-5-hydroxy-1-indanone and 230 mg. (4 millimols) of methyl isocyanate are stirred in 20 ml. of dioxane, in the presence of 1 drop of triethylamine, for 50 hours at 50° C. The thus-obtained solid product is filtered off and recrystallized from dimethylformamide. Yield: of the title compound: 400 mg. (61 percent of theory); m.p. 228°C. (decomposition).

| C$_{16}$H$_{12}$N$_2$O$_6$ | (328.3) |
| --- | --- |
| Calculated: | N 8.53 |
| Found: N 8.76 | |

EXAMPLE 9

2-(5-Nitro-2-furfurylidene)-5-ethylaminocarbonyloxy-1-indanone

The title compound is produced analogously to Example 8 with ethyl isocyanate and recrystallized from ethanol. Yield: 50 percent of theory; m.p. 265° C. (decomposition).

| C$_{17}$H$_{14}$N$_2$O$_6$ | (342.3) |
| --- | --- |
| Calculated: | N 8.18 |
| Found: N 7.95 | |

EXAMPLE 10

2-(5-Nitro-2-furfurylidene)-5-(2-dimethylaminoethoxy)-1-indanone hydrochloride 1.5 g. of 5-(2-dimethylaminoethoxy)-1-indanone hydrochloride and 1.92 g. of 5-nitrofurfural diacetate are stirred in 20 ml. of orthophosphoric acid for 20 hours at 50° C. The reaction mixture is poured into ice water, neutralized with NaOH, shaken out with ethyl acetate, and the ethyl acetate solution is washed with water, dried with Na$_2$SO$_4$, and evaporated. The thus-obtained 2-(5-nitro-2-furfurylidene)-5-(2-dimethylaminoethoxy)-1-indanone is taken up in methanol, mixed with alcoholic HCl and evaporated. The residue is recrystallized from methanol. Yield of the title compound: 1.1 g. (50 percent of theory); m.p. 238° C. (decomposition).

| C$_{18}$H$_{19}$ClN$_2$O$_5$ | (378.8) | |
| --- | --- | --- |
| Calculated: | Cl 9.36 | N 7.39 |
| Found: | Cl 9.41 | N 7.42 |

EXAMPLE 11

2-(5-Nitro-2-furfurylidene)-5-(2-diethylaminoethoxy)-1-indanone sulfate 600 mg. of 5-(2-diethylaminoethoxy)-1-indanone hydrochloride and 300 mg. of 5-nitrofurfural are stirred in 10 ml. of acetic acid, in the presence of 0.112 ml. of concentrated H$_2$SO$_4$, for 6 hours at 100° C. The reaction mixture is then evaporated under a vacuum, and the residue is recrystallized from ethanol/water 3:1. Yield of the title compound: 300 mg. (31 percent of theory); m.p. 248° C.

| C$_{20}$H$_{22}$N$_2$O$_5$·H$_2$SO$_4$ (468.5) | | |
| --- | --- | --- |
| Calculated: | N 5.98 | S 6.84 |
| Found: | N 5.87 | S 6.73 |

EXAMPLE 12

2-(5-Nitro-2-furfurylidene)-5-(2-pyrrolidinoethoxy)-1-indanone sulfate

The title compound is prepared analogously to Example 11 from 245 mg. of 5-(2-pyrrolidinoethoxy)-1-indanone and 141 mg. of 5-nitrofurfural and recrystallized from methanol. Yield: 200 mg. (43 percent of theory); m.p. 234° C.

| C$_{20}$H$_{20}$N$_2$O$_5$·H$_2$SO$_4$ | (466.5) |
| --- | --- |
| Calculated: N 6.01 | S 6.87 |
| Found: N 5.79 | S 6.76 |

EXAMPLE 13

2-(5-Nitro-2-furfurylidene)-5-(2-piperidinoethoxy)-1-indanone sulfate

The title compound is produced analogously to Example 11 from 450 mg. of 5-(2-piperidinoethoxy)-1-indanone hydrochloride and 250 mg. of 5-nitrofurfural. The reaction product is recrystallized from ethanol; yield: 200 mg. (27 percent of theory); m.p. 165° C.

| C$_{21}$H$_{22}$N$_2$O$_5$·H$_2$SO$_4$ | (480.5) |
| --- | --- |
| Calculated: N 5.83 | S 6.67 |
| Found: N 5.63 | S 6.30 |

EXAMPLE 14

2-(5-Nitro-2-furfurylidene)-5-(2-morpholinoethoxy)-1-indanone sulfate

The title compound is obtained analogously to Example 11 from 600 mg. of 5-(2-morpholinoethoxy)-1-indanone hydrochloride and 280 mg. of 5-nitrofurfural and recrystallized from methanol/water 1:1. Yield: 400 mg. (41 percent of theory); m.p. 262° C. (decomposition).

| $C_{20}H_{20}N_2O_6 \cdot H_2SO_4$ | | (482.4) |
|---|---|---|
| Calculated: | N 5.81 | S 6.64 |
| Found: | N 5.58 | S 6.43 |

EXAMPLE 15

2-(5-Nitro-2-furfurylidene)-5-(2-n-butylaminoethoxy)-1-indanone sulfate 0.7 g. of 5-(2-n-butylaminoethoxy)-1-indanone hydrochloride and 0,35 g. of 5-nitrofurfural are stirred in 10 ml. of acetic acid, in the presence of 0.13 ml. of concentrated $H_2SO_4$, for 6 hours at 100° C. and then concentrated by complete evaporation. The title compound is obtained as an oil which is treated several times with ether and freed of all volatile substances under a vacuum.

| $C_{20}H_{24}N_2O_6S$ | (468.5) | |
|---|---|---|
| Calculated: | N 5.98 | S 6.85 |
| Found: | N 5.73 | S 6.54 |

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

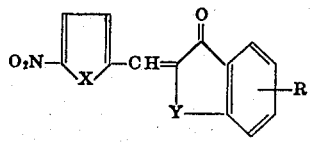

wherein X is O, S or -NH-, Y is -CH$_2$-, and R is a member of the group consisting of benzoyloxy, nitro, alkoxycarbonyloxy, N-monoalkylaminocarbonyloxy, N,N-dialkylaminocarbonyloxy and an N-substituted- or N-unsubstituted-aminoalkoxy group in which the N-substituted amino is a member of the group consisting of monoalkylamino, dialkylamino, pyrrolidino, piperidino, piperazino, N-alkylpiperazino, N-alkanoylpiperazino and morpholino, wherein alkoxy, alkyl and alkanoyl in each instance contain one to five carbon atoms, and the acid addition salts of those of the above-defined compounds which contains a basic amino group.

2. A compound of claim 1 wherein X is O.
3. A compound of claim 3 wherein R is a 4-position substituent.
4. A compound of claim 3 wherein R is a 5-position substituent.
5. A compound of claim 2 wherein X is -NH-.
6. A compound of claim 1, 2-(5-nitro-2-furfurylidene)-4-nitro-1-indanone.
7. A compound of claim 1, 2-(5-nitro-2-pyrrolylmethylene)-4-nitro-1-indanone.
8. A compound of claim 1, 2-(5-nitro-2-furfurylidene)-5-benzoyloxy-1-indanone.
9. A compound of claim 1, 2-(5-nitro-2-furfurylidene)-5-methoxycarbonyloxy-1-indanone.
10. A compound of claim 1, 2-(5-nitro-2-furfurylidene)-5-ethoxycarbonyloxy-1-indanone.
11. A compound of claim 1, 2-(5-nitro-2-furfurylidene)-5-dimethylaminocarbonyloxy-1-indanone.
12. A compound of claim 1, 2-(5-nitro-2-furfurylidene)-5-diethylaminocarbonyloxy-1-indanone.
13. A compound of claim 1, 2-(5-nitro-2-furfurylidene)-5-methylaminocarbonyloxy-1-indanone.
14. A compound of claim 1, 2-(5-nitro-2-furfurylidene)-5-ethylaminocarbonyloxy-1-indanone.
15. A compound of claim 1, 2-(5-nitro-2-furfurylidene)-5-(2-dimethylaminoethoxy)-1-indanone.
16. A compound of claim 1, 2-(5-nitro-2-furfurylidene)-5-(2-dimethylaminoethoxy)-1-indanone hydrochloride.
17. A compound of claim 1, 2-(5-nitro-2-furfurylidene)-5-(2-diethylaminoethoxy)-1-indanone sulfate.
18. A compound of claim 1, 2-(5-nitro-2-furfurylidene)-5-(2-pyrrolidinoethoxy)-1-indanone sulfate.
19. A compound of claim 1, 2-(5-nitro-2-furfurylidene)-5-(2-piperidinoethoxy)-1-indanone sulfate.
20. A compound of claim 1, 2-(5-nitro-2-furfurylidene)-5-(2-morpholinoethoxy)-1-indanone sulfate.
21. A compound of claim 1, 2(5-nitro-2-furfurylidene)-5-(2-n-butylamino-ethoxy)-1-indanone sulfate.

* * * * *